(12) United States Patent
Gentile et al.

(10) Patent No.: US 6,180,007 B1
(45) Date of Patent: *Jan. 30, 2001

(54) MEMBRANE FORMED BY AN ACRYLONITRILE-BASED POLYMER

(75) Inventors: Frank Gentile, Warwich, RI (US); Molly Shoichet, Canton, CA (US); Milton Harris, Huntsville, AL (US)

(73) Assignee: Neurotech, SA, Evry (FR)

( * ) Notice: Under 35 U.S.C. 154(b), the term of this patent shall be extended for 0 days.

This patent is subject to a terminal disclaimer.

(21) Appl. No.: 09/016,518

(22) Filed: Jan. 31, 1998

Related U.S. Application Data

(63) Continuation of application No. 08/535,213, filed as application No. PCT/US94/04620 on Jan. 16, 1996, now Pat. No. 5,720,969, which is a continuation-in-part of application No. 08/053,899, filed on Apr. 27, 1993, now abandoned.

(51) Int. Cl.[7] ............................. C08L 20/44; C08L 81/02; C12N 11/04; C12N 11/08
(52) U.S. Cl. ................................. 210/500.23; 210/500.43; 525/187; 525/329.1; 525/329.2; 525/385; 424/424; 435/182
(58) Field of Search .................................. 525/187, 329.1, 525/329.2, 385; 210/500.23, 500.43; 424/424; 435/182

(56) References Cited

U.S. PATENT DOCUMENTS 5,158,881 * 10/1992 Aebischer .
5,720,969 * 2/1998 Gentile .

FOREIGN PATENT DOCUMENTS

1411843 * 10/1975 (GB) .

* cited by examiner

*Primary Examiner*—David Buttner
(74) *Attorney, Agent, or Firm*—Mintz, Levin, Cohn, Ferris and Popeo, P.C.; Ivor R. Elrifi

(57) ABSTRACT

A permselective graft polymer is disclosed that is formed by converting into intermediate reactive sites a portion of the cyano groups of a backbone polymer containing —$CH_2$—CH(—C≡N)— units, and grafting polyalkylene oxide polymer chains to the backbone polymer through the reactive sites. Either the backbone polymer of a polymer resin or a permselective polymer membrane can be grafted. When a resin is used, it is formed into a permselective polymer membrane using known methods. The resulting permselective membrane can be formed into hollow fibers or flat sheets for the encapsulation of living cells. The encapsulated cells are then implanted into a patient in need of the biologically active factors produced by the cells. The permselective graft polymer membrane exhibits good molecular diffusion with minimal protein adsorption.

9 Claims, 7 Drawing Sheets

MEMBRANE FORMED BY AN ACRYLONITRILE-BASED POLYMER

REFERENCE TO RELATED APPLICATION

This application is a continuation U.S. application Ser. No. 08/535,213, filed Jan. 16, 1996, now U.S. Pat. No. 5,720,769, which is a national phase (§371) application based on PCT/US94/04620, filed Apr. 26, 1994, which is a continuation-in-part of U.S. application Ser. No. 08/053,899, filed Apr. 27, 1993 (abandoned).

FIELD OF THE INVENTION

The technical field of this concerns graft polymers and graft polymer membranes useful for the encapsulation of living cells which produce biologically active factors. More particularly, the present invention relates to graft homopolymers and copolymers of poly(acrylonitrile) and polyalkylene oxide. The graft polymer membranes are permselective and allow proteins produced by the encapsulated cells to be readily diffused through the membrane.

BACKGROUND OF THE INVENTION

Selectively permeable membranes have been used to encapsulate cells which secrete biologically-active factors useful for the treatment of various diseases and disorders. Typically, the cells are loaded into the membranes which are in the form of hollow fibers or between two flatsheets in the form of a sandwich. The fibers are then sealed at the ends to form "macrocapsules". The encapsulated cells are implanted into a patient in need of the biologically-active factors produced by the cells. Macrocapsules offer the advantage of easy retrievability, an important feature in therapeutic implants.

An example of macrocapsules can be found in U.S. Pat. No. 4,892,538, which describes the encapsulation of neurotransmitter-secreting cells which are implanted into a patient having a neurotransmitter-deficiency disease.

U.S. Pat. No. 5,158,881 also discloses methods and systems for encapsulating cells which produce biologically-active factors. The cells are encapsulated with a semipermeable polymeric membrane by co-extruding an aqueous cell suspension and a polymeric solution through a common port to form a tubular extrudate having a polymeric outer coating which encapsulates the cell suspension. Cells can also be loaded into pre-formed hollow fiber membranes.

Typically, the semipermeable membranes used to encapsulate cells are formed from polymeric materials such as acrylic copolymers, polyvinylidene fluoride, polyurethane isocyanates, polyalginate, cellulose acetate, polysulfone, polyvinyl alcohols, polyacrylonitrile and mixtures or derivatives thereof. Poly(acrylonitrile-co-vinyl chloride) (PAN/PVC) is one of the polymers used to make implantable membranes because it can easily be made into permselective membranes that allow easy transport of nutrients and greatly reduce transport of immuno-molecules. These membranes can be made with a wide variety of wall thicknesses and morphologies. PAN/PVC is moderately hydrophilic and is non-toxic to cells.

While these materials have the capability of being formed into permeable-selective, biocompatible membranes, there exists the need to further improve the characteristics of the membranes to increase their utility for macroencapsulation purposes. One shortcoming of some polymeric membranes is that proteins secreted from the encapsulated cells and proteins from the patient, tend to adsorb to them, thus decreasing the diffusion rate of the protein to the patient and hence the efficiency of the implant.

Various modifications have been made to polymeric materials to change their characteristics and to improve their usage for particular therapeutic applications. For example, U.S. Pat. No. 4,871,785 to Froix et al. describes hydrogel contact lens compositions which are modified to contain significant amounts of a cross-linking material such as polyethylene oxide. The modification results in a lens having decreased protein adsorption. Allmer et al. have grafted polyethylene glycol (PEG) and heparin onto polymer surfaces to inhibit protein adsorption and to prevent surface activated blood clotting [*J. of Polymer Sci.* Vol 28:176–183 (1990)]. Miyama et al. describe graft copolymers having improved antithrombogenicity after being heparinized [*J.Biomed Mater. Res.*, Vol. 11:251–265 (1977)]. U.S. Pat. No. 4,424,311 to Nagaoka et al. describes an antithrombogenic biomedical material comprising a polymer having a polyethylene oxide unit. U.S. Pat. No. 4,965,112 to Brinkman et al. describes a method for applying polyethylene oxide coating to polyether-urethane molded articles such as catheters in order to improve blood-compatibility. Published PCT application PCT/US91/07051 describes grafting poly (ethylene oxide) onto microcapsules made of polycationic polymers such as poly(l-lysine). Fane et al. disclose that treating various ultrafiltration membranes with nonionic surfactants can enhance flux of protein solutions [*Desalination*, Vol. 53:37–55 (1985)].

SUMMARY OF THE INVENTION

It is an object of the present invention to provide a biocompatible, permselective hollow fiber membrane which exhibits good molecular diffusion with minimal protein adsorption.

It is a further object of the invention to provide graft polymer and copolymer membranes having functional surface groups by which additional modifications can be performed to further increase the utility and biocompatibility of the membranes.

These objects are accomplished by the graft polymer and permselective graft polymer membranes of the present invention. The graft polymer is formed by converting into intermediate reactive sites a portion of the C≡N (cyano) groups of a backbone polymer containing

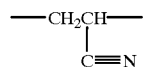

units.

Polyalkylene oxide polymer chains are then grafted to the backbone polymer through the reactive sites.

In one embodiment, the graft polymer is formed by copolymerizing acrylonitrile monomer and vinyl chloride monomer to form a backbone copolymer. The backbone copolymer includes the following groups along the copolymer chain:

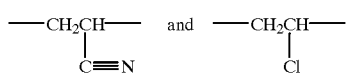

where a portion of the —C≡N (cyano) groups have been converted into intermediate reactive sites.

Polyalkylene oxide polymer chains are then grafted to the backbone copolymer through the reactive sites.

In one embodiment, the polyalkylene oxide polymer chains are used to modify the backbone polymer of a permselective polymer membrane to form a permselective graft polymer membrane. In another embodiment, the polyalkylene oxide polymer chains are used to modify the backbone polymer of a polymer resin to form a graft polymer resin. The resin is then formed into a permselective graft polymer membrane using methods known in the art.

The invention also comprises a method for forming a graft polymer where acrylonitrile monomer and vinyl chloride monomer are copolymerized to form a backbone copolymer including the following groups:

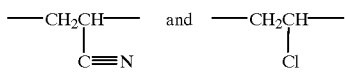

A fraction of the cyano groups are then converted into intermediate reactive sites and polyalkylene oxide polymer chains are grafted to the backbone copolymer through the reactive sites.

BRIEF DESCRIPTION OF THE DRAWINGS

The invention can be more fully understood from the following description when read together with the accompanying drawings in which.

DETAILED DESCRIPTION OF THE INVENTION

Figure 1:
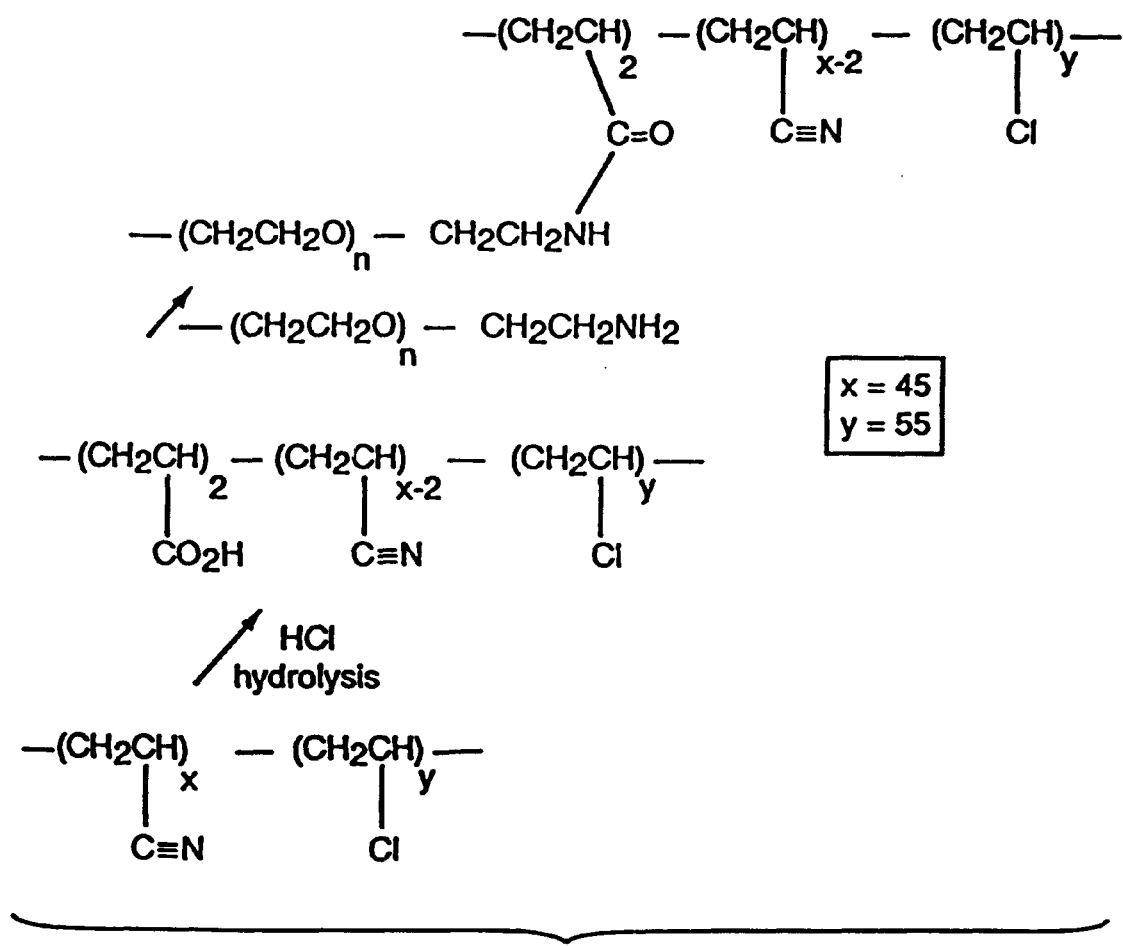
FIG. 1 shows the acid hydrolysis of a poly(acrylonitrile-co-vinyl chloride) (PAN/PVC) backbone, wherein x and y represent the ratio of acrylonitrile to vinyl chloride, respectively. The hydrolyzed PAN/PVC copolymer is then derivatized with polyethylene glycol amine.

The inventors have found that a modification of poly(acrylonitrile) (PAN)-based hollow fibers with an activated poly(alkylene) oxide (PAO) results in a permselective biocompatible membrane having decreased protein adsorption. The membrane of the present invention is a graft polymer that exhibits considerably less protein adsorption than the copolymer of polyvinyl chloride and polyacrylonitrile (PAN/PVC). Without being limited to a particular theory, PAO is thought to exclude a volume about the surface, thereby inhibiting proteins from "arriving" at or adsorbing to the membrane. The un-modified membrane is insoluble in aqueous solution whereas PAO, as are proteins, is soluble in aqueous solution. The PAO chain is thought to extend from the insoluble surface into the aqueous solution, thereby inhibiting protein adsorption.

In addition to decreasing protein adsorption of the membrane, the grafted PAO provides hydroxy groups onto which additional molecules can be attached. For example, it may be desirable to attach various proteins, cellular adhesion molecules, anti-cellular adhesion molecules, etc. Also, enzymes could be attached that bind or inactivate viruses or IgG, thus improving the biocompatibility of the permselective membrane.

As used herein, the term "permselective" is used to describe a biocompatible membrane that allows the passage of substances up to a predetermined size, but prevents the passage of larger substances. More specifically, the membrane is produced in such a manner that it has pores or voids of a predetermined range of sizes; as a result, the vehicle is permselective. The molecular weight cutoff (MWCO) selected for a particular membrane will be determined in part by the type and extent of immunological rejection it is anticipated will be encountered after the membrane is implanted and in part by the molecular size of the largest substance to be allowed to pass into and/or out of the vehicle. For example, membranes can be formed which allow passage of molecules up to about the size of C1q, a component of complement (about 400 kD), a protein required for the assembly of the cytolytic complement attack complex. In this instance, substances smaller than C1q can pass freely. It is also possible to form permselective membranes which allow passage of molecules up to about the size of immunoglobulin G (about 150 kD) and exclude larger molecules. Further, permselective membranes or hydrogels which allow passage of molecules up to about the size of immunoglobulin M (about 1,000 kD) can be used; only very large substances, such as cells, will be excluded in this embodiment.

The permselective membranes can be formed into hollow fibers or flat sheets. A hollow fiber membrane is an annulus consisting of an inner cylindrical surface, a wall structure for support, and an outer cylinder surface. One or both of the surfaces can be selective for molecules of varied molecular weight. A flatsheet is a planar composition of a hollow fiber.

In one embodiment, a membrane formed by copolymerizing acrylonitrile monomer and vinyl chloride monomer to form a backbone copolymer of PAN/PVC is obtained. However other PAN-based copolymer membranes can also be used including but not limited to PAN-co-vinylidene chloride, PAN-co-acrylic acid, PAN-co-butadiene-styrene, PAN-co-butadiene, PAN-co-vinyl acetate, PAN-co-4-vinyl pyridine, PAN-co-butadiene-co-acrylic acid, and PAN-co-maleic anhydride. Also, PAN homopolymer, and PAN-based block copolymer membranes can be used as well. As used herein, the term "copolymer" includes terpolymers. It also includes random copolymers and block copolymers. Methods known in the art can be used to form PAN copolymer membranes, including U.S. Pat. No. 2,763,631 to Coover et al., U.S. Pat. No. 2,420,330 to Shriver et al., and U.S. Pat. No. 4,334,046 to König et al., which describe PAN/PVC and are incorporated herein by reference.

Once the PAN-based polymer membrane is obtained, a portion of the —C≡N (cyano) groups of the backbone are converted into intermediate reactive sites. Polyalkylene oxide polymer chains (e.g. polyethylene glycol or polypropylene glycol, preferably the former) are then grafted to the backbone copolymer through the reactive sites. The polyalkylene oxide polymer chains used in the present invention are substantially water soluble. The reactive sites are groups to which the PAO terminal groups may react within a single reaction step.

In one method, the reactive sites of the PAN/PVC backbone membrane are formed by hydrolysis of the cyano groups into a chemically available carboxyl group. The carboxyl groups are reacted with an amine terminal group on a precursor polyalkylene oxide (PAO) polymer chain to form the graft copolymer. For example, in FIG. 1, the carboxyl groups of the PAN/PVC backbone are formed by acid hydrolysis. They are then reacted with polyethylene glycol-amine to produce a graft copolymer. FIG. 1 depicts the acid hydrolysis of a PAN/PVC copolymer wherein the ratio of acrylonitrile to vinyl chloride is 45:55. However, other ratios of acrylonitrile to vinyl chloride may also be used.

Figure 2:
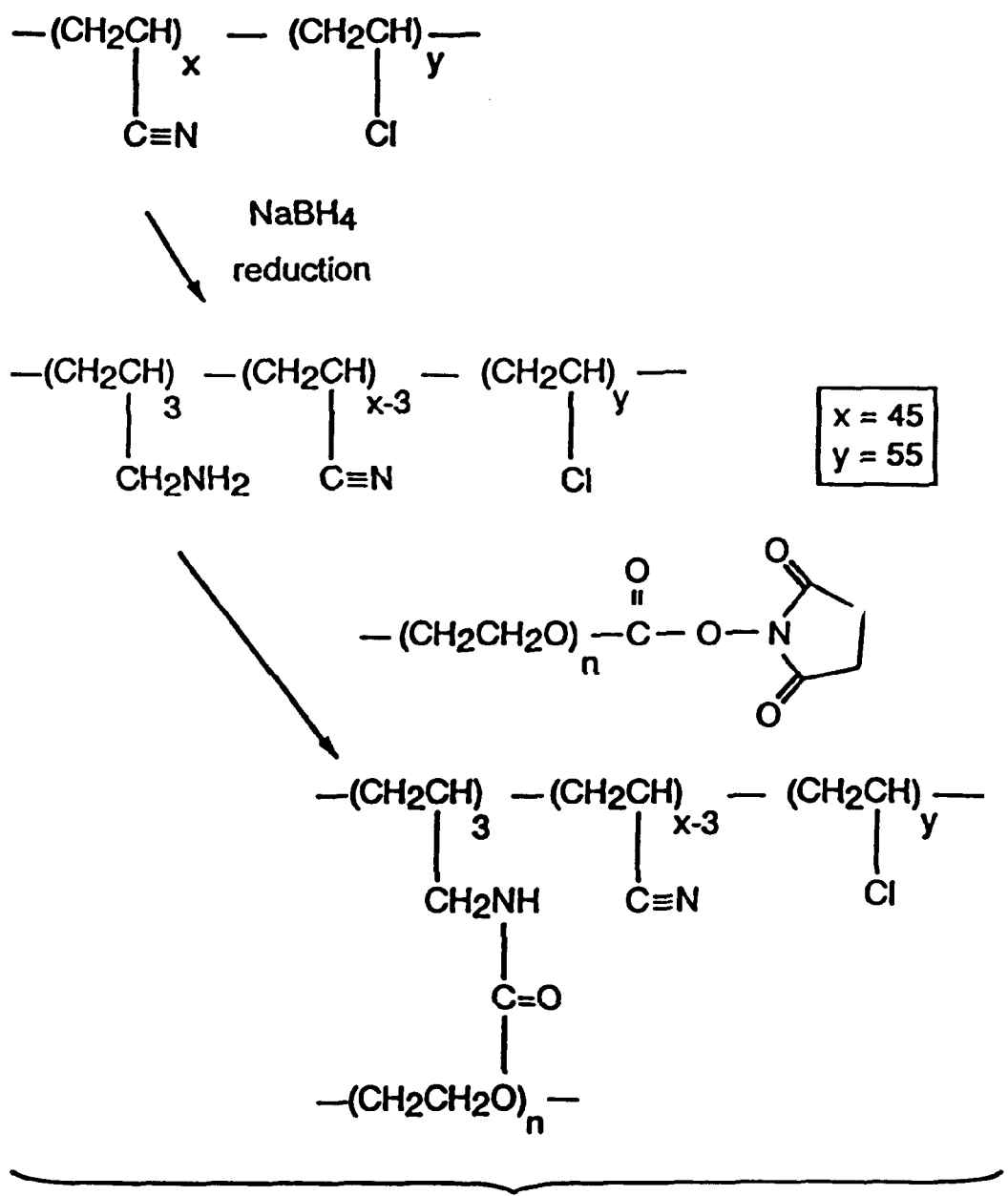
FIG. 2 shows the sodium borohydride reduction of a PAN/PVC backbone, wherein x and y represent the ratio of acrylonitrile to vinyl chloride, respectively. The reduced PAN/PVC copolymer is then derivatized with polyethylene glycol succinimide.

The graft copolymers of the present invention can also be formed by reduction of PAN/PVC. The reactive sites are formed by reduction of the cyano groups into amine groups. The applicants have found that sodium borohydride reduction of the copolymer produces amino groups that can be used to bind an activated PAO such as a succinimidyl carbonate-derivatized PAO. This is shown in FIG. 2, where the amine groups are then reacted with polyethylene glycol succinimide. Activated PAOs can be commercially obtained, for example, from Polysciences, Inc., Warrington, Pa. and Shearwater Polymers, Huntsville, Ala.

Another method for producing the graft copolymers of the present invention, involves reacting the chloride groups of PVC with thiol urea to produce thiol groups on PVC (PVC-SH) and then reacting epoxide terminated PAO with PVC-SH to produce grafted PAO units on the PVC portion of PAN/PVC fibers.

PAN/PVC-PEG can also be produced by reacting amine-terminated polyethylene oxide (PEO-NH$_2$) with 4-fluoroaniline amino azide to produce PEO functionalized with a nitrene group (i.e. PEO-phenyl azide). The nitrene reacts photochemically and randomly by insertion into C—H bonds, thereby functionalizing the PAN/PVC backbone randomly.

Proton NMR is a suitable analytical procedure for quantifying the amount of PAO attached to the PAN/PVC. The graft copolymer can also be characterized by other spectroscopic methods such as attenuated total reflectance fourier transform infrared spectroscopy (ATR FTIR) and x-ray photoelectron spectroscopy (XPS). By ATR FTIR, it is evident that the PAN nitrile group is hydrolyzed via an amide group. Although all nitrile groups are not completely hydrolyzed, they react with PEG-amine. As shown by ATR FTIR, the amide peak area increases whereas the carboxylic acid peak decreases. In addition, the presence of a (C—O) peak at 1100 cm$^{-1}$ is evident in the IR spectrum, indicative of the PEG. Reduction of the nitrile group of PAN/PVC also gives rise to an amide peak of unknown origins. However, after coupling with the PEG-succinimide, a (C—O) peak at 1100 cm$^{-1}$ is present and a decrease of the (N—H) peak and an increase in the amide peak are evident. By proton NMR, the reduction of PAN/PVC and the grafting of PEG is evident from chemical shifts.

In another embodiment of the invention, a polymer resin itself may first be modified, and then a membrane may be formed from the modified resin using methods known in the art such as the methods described by H. Strathmann in *Material Science of Synthetic Membranes*, "Production of Microporous Media by Phase Inversion Processes," pp. 165–195. *American Chemical Society* (1985). Basically, the resin is modified using the same chemistry as is described above for the PAO modification of the surface of a polymer membrane. The term "resin" as used herein refers to the bulk form of a polymer and includes resins that are in powder, liquid, or pellet forms.

Protein adsorption involves the interaction of proteins in solution with a solid (insoluble) surface. The interaction can be described as either chemisorption (e.g. ionic) or physisorption (e.g. hydrophobic). PAO modification of the surface inhibits protein adsorption which is a surface phenomenon. While the surface of a non-porous film is well defined, that of a phase inversion membrane is not. For the latter, the surface that is exposed to protein includes the surface of the pores that run through the membrane. Modification of a polymer resin prior to membrane formation is a method that may allow for more even modification of the interstices of the pores than methods that involve surface modification of the membrane.

EXAMPLES 1–4

Formation of Graft Copolymer Membranes

In order to exemplify but not limit the scope of the invention, the following examples are provided to show various procedures useful for attaching PAO to a PAN/PVC copolymer.

EXAMPLE 1

Reduction of Polymer with NaBH$_4$

Copolymer (sheets or tubes) was suspended in a 10% aqueous solution of NaBH$_4$ (0.7 g in 7 ml water) for 48 h at room temperature, then washed with water and 95% ethanol.

EXAMPLE 2

Coupling of Sc-PEG with Reduced Polymer

Reduced copolymer was stirred with 7 ml of sodium phosphate buffer pH 8.0. SC-PEG 20,000 (0.7 g) was added and stirring continued at 40° C. for 2 h. The reacted polymer was then washed with water and 95% ethanol and left in 95% ethanol at 40° C. for 48 h. The sample was then washed with water. A similar experiment was conducted with SC-PEG 8,000 except that the reaction was conducted at room temperature and all washes were done with water.

EXAMPLE 3

Hydrolysis of Polymer with HCl-NaOH

Copolymer was stirred for 48 h in 10 ml of concentrated HCl, then washed with water. The polymer was then added to 10 ml of 10M NaOH solution and stirred for 48 h. The product was washed with water until neutral then treated with 5% oxalic acid for 10 minutes and again washed with water and 95% ethanol.

EXAMPLE 4

Coupling of MPEG-NH$_2$ (5000) to Hydrolyzed Polymer

M-PEG-NH$_2$ (0.7 g), N-(3-dimethylaminopropyl)-ethyl carbodiimide (0.28 g) and hydrolyzed polymer were stirred in water (7 ml). The pH of the mixture was adjusted to 4.5 with dilute HCl. The mixture was heated to 40° C. for 5 h, then washed with water and 95% ethanol and kept in 95% ethanol at 40° C. for 48 h. A final wash with water was performed. A companion experiment without ethanol washing was performed.

The products prepared from Examples 1–4 were examined with $^1$H NMR. The NMR spectra were obtained by dissolving 4 to 5 mg of the polymer samples in 0.5 ml of d$_6$-acetone. Spectra were obtained on a 200 MHz Bruker machine. All peaks were relative to acetone.

Figure 3:
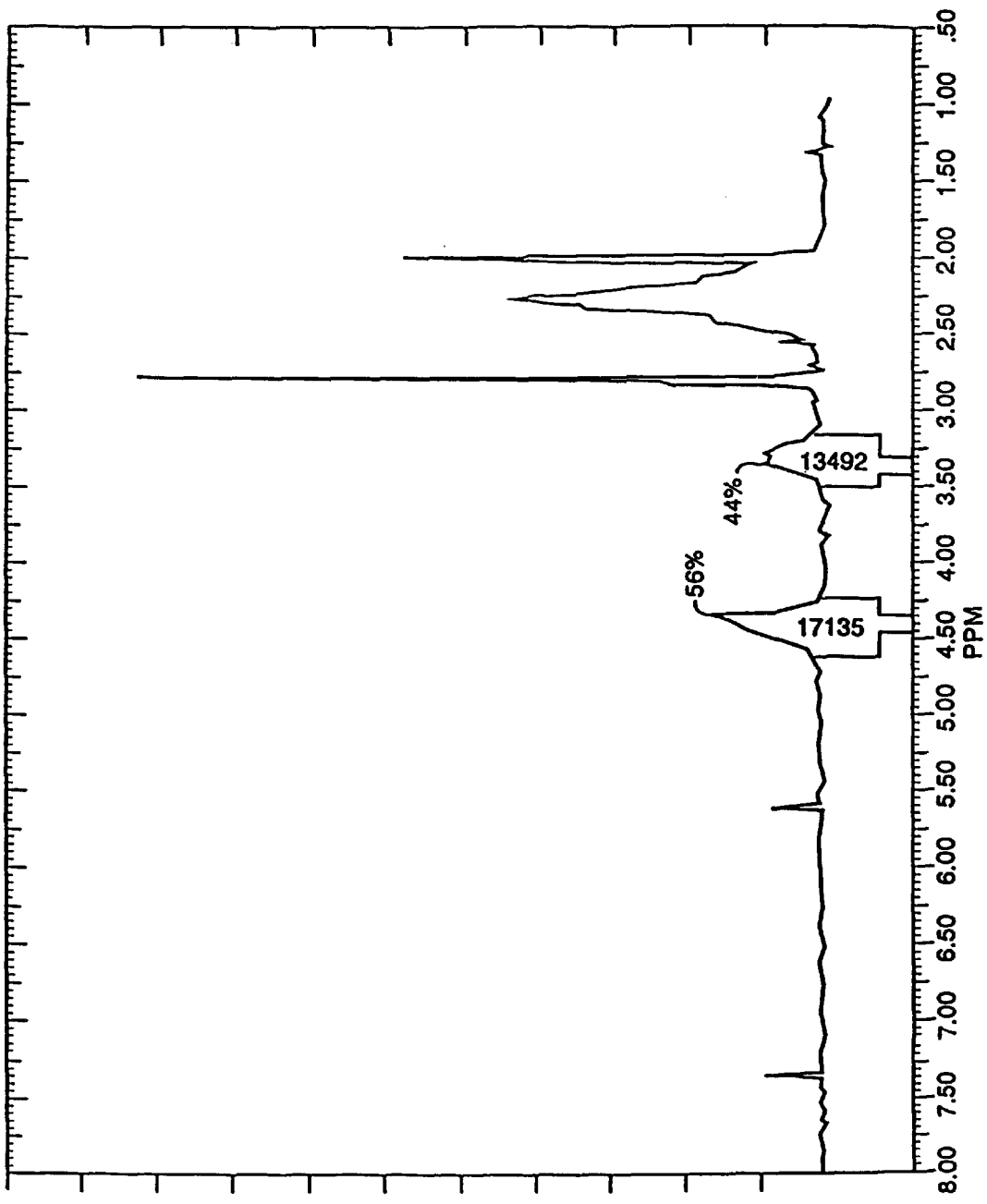
FIG. 3 shows the $^1$H NMR spectrum for PAN/PVC copolymer.

The NMR spectrum for the starting PAN/PVC copolymer is shown in FIG. 3. Note the H—C—Cl peak at 4.43 ppm (peak A), H—C—CN peak at 3.39 ppm (peak B), water at 2.87 ppm, —CH$_2$— at 2.44 ppm, and acetone at 2.06 ppm. The ratio of peak A to peak B is 55/45, thus indicating that the polymer contains 55% vinyl chloride to 45% acrylonitrile.

Figure 4:
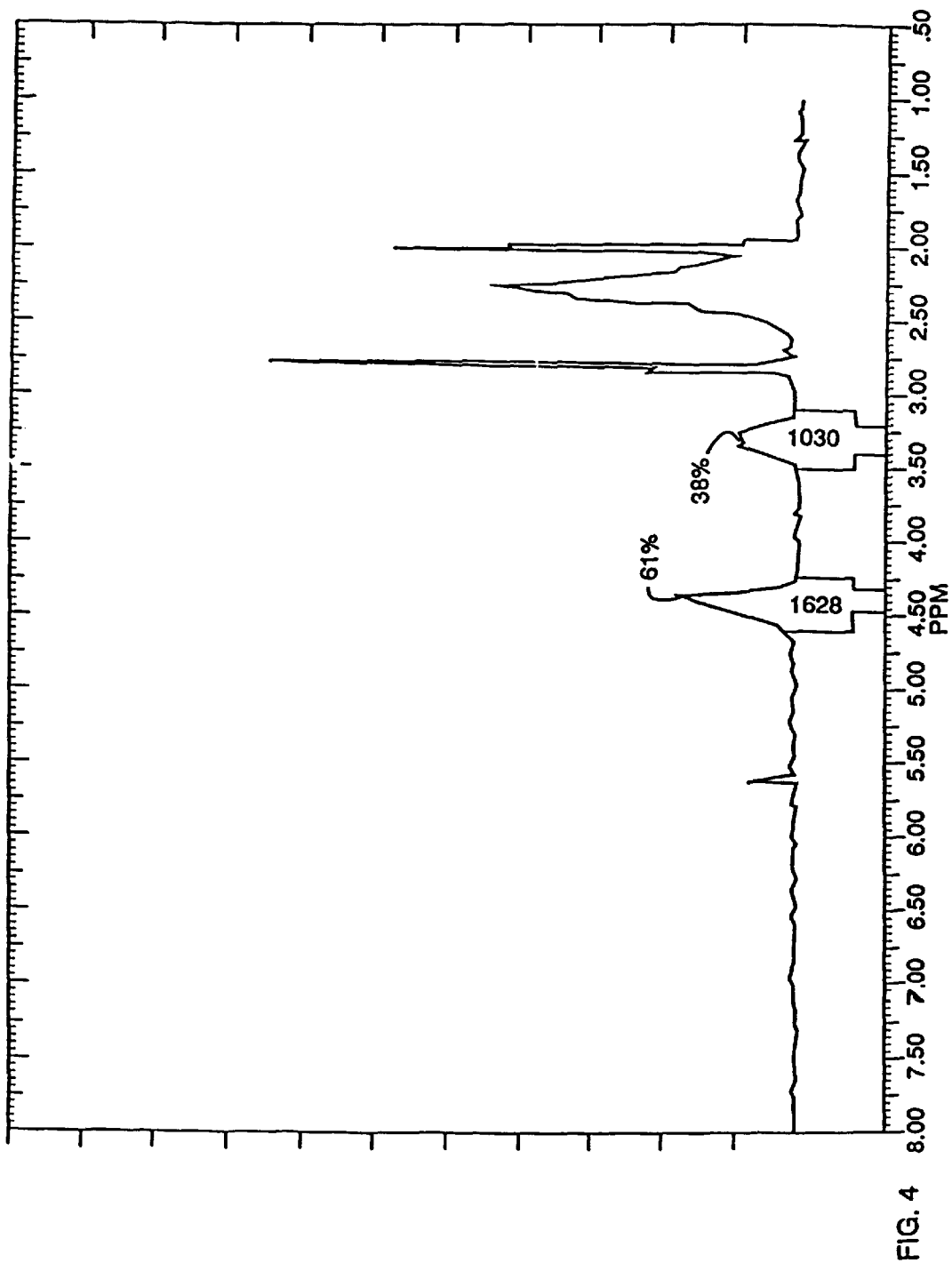
FIG. 4 shows the $^1$H NMR spectrum for reduced PAN/PVC copolymer.

The spectrum for reduced polymer as prepared in Example 1 is shown in FIG. 4. The A/B ratio increases to 62/38 (as expected for borohydride reduction of the —CN group and consequent decrease in size of the H—C—CN peak).

Figure 5:
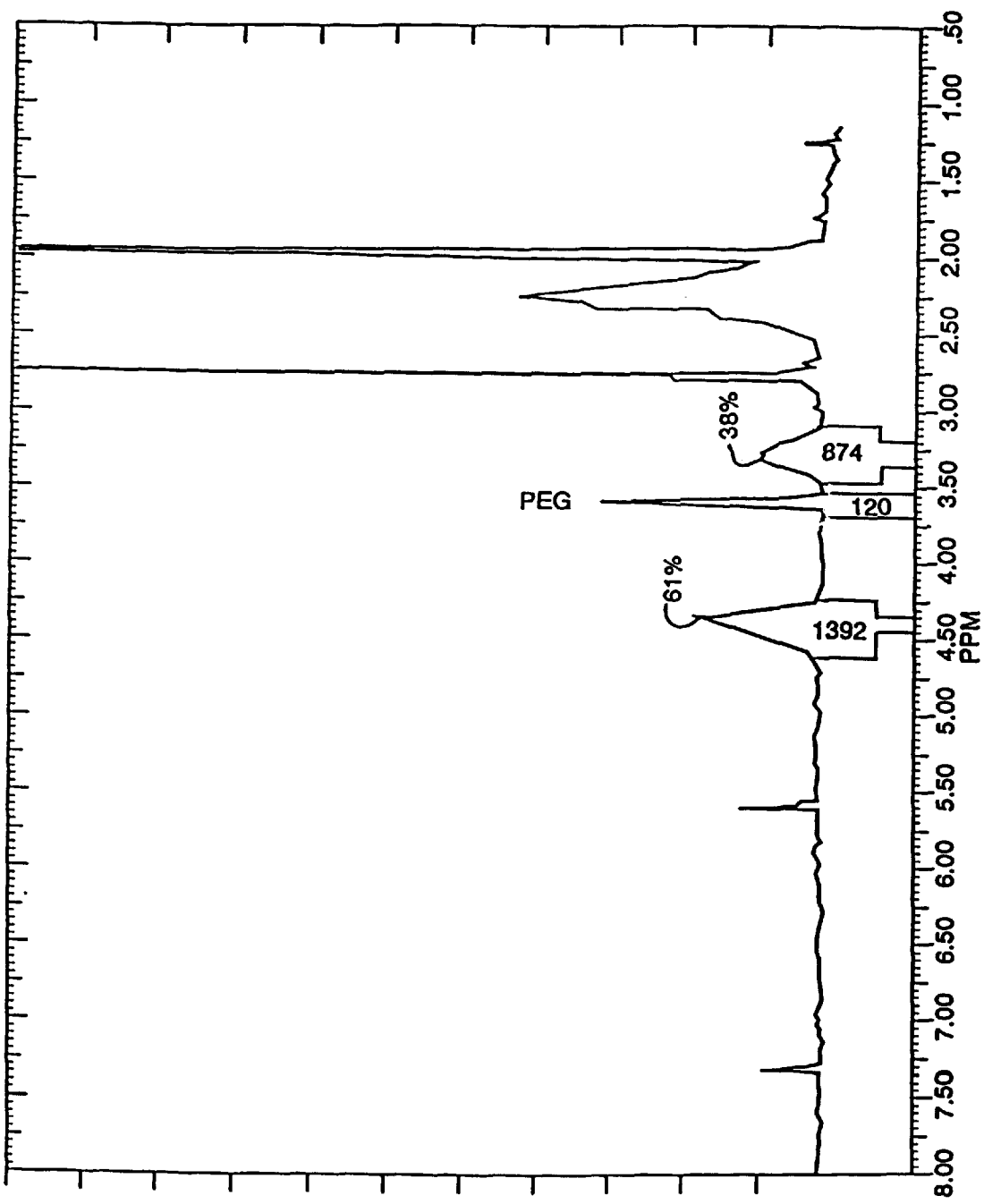
FIG. 5 shows the $^1$H NMR spectrum for SC-PEG-8000 coupled to reduced polymer.

The spectrum for SC-PEG-8000 coupled to reduced polymer, as prepared in Example 2, is shown in FIG. 5. This clearly shows the incorporation of PEG, which has a peak at 3.60 ppm. Addition of all the areas and division into the PEG area (120) shows 1.8% PEG.

Figure 6:
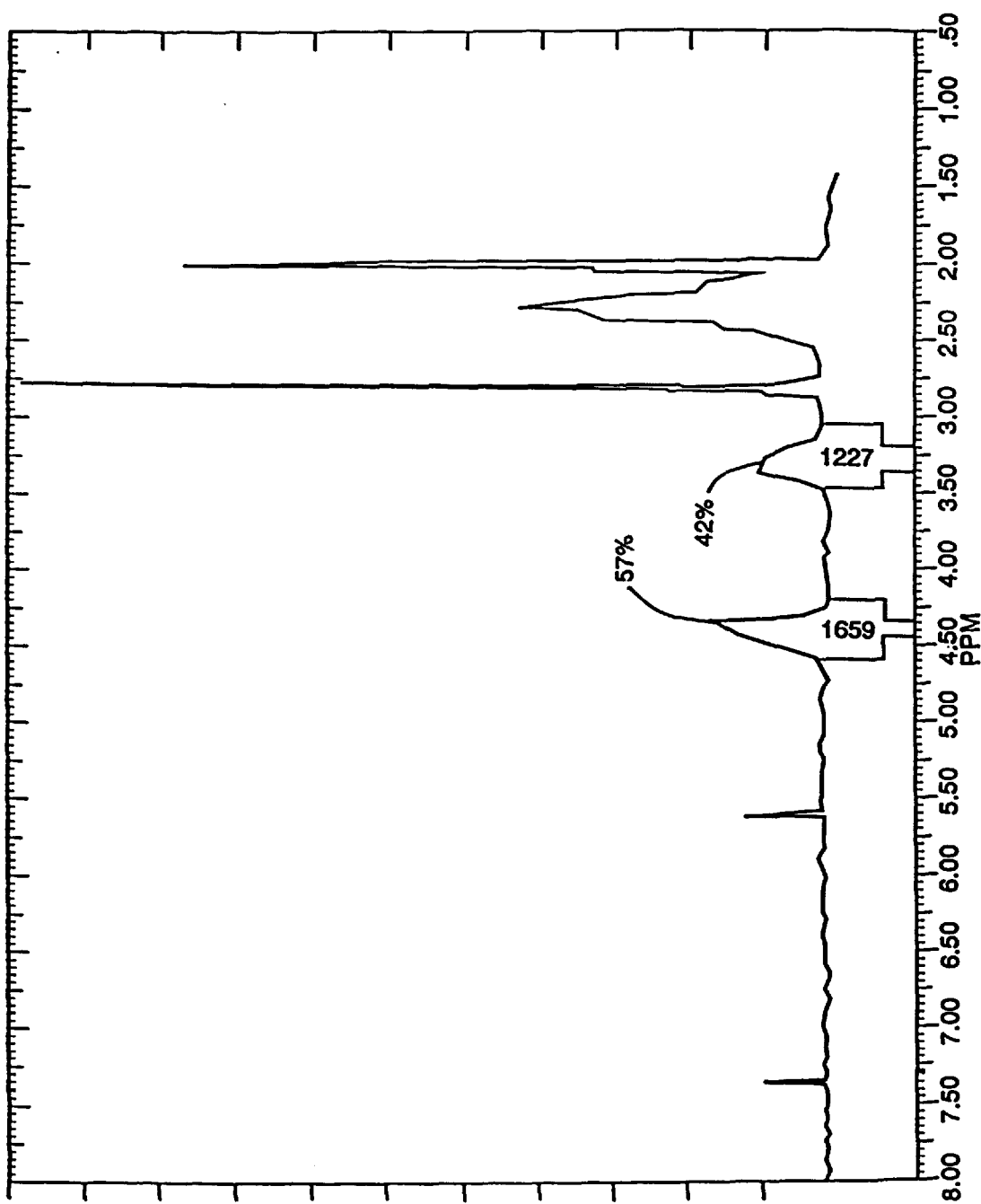
FIG. 6 shows the $^1$H NMR spectrum for hydrolyzed PAN/PVC copolymer.

The spectrum for the hydrolyzed polymer, as prepared in Example 3, is shown in FIG. 6. This shows an A/B ratio very similar to the starting material. This indicates that the new —CH—CO$_2$— and —CH—CONH$_2$ peaks are close to the —CH—CN peak.

Figure 7:
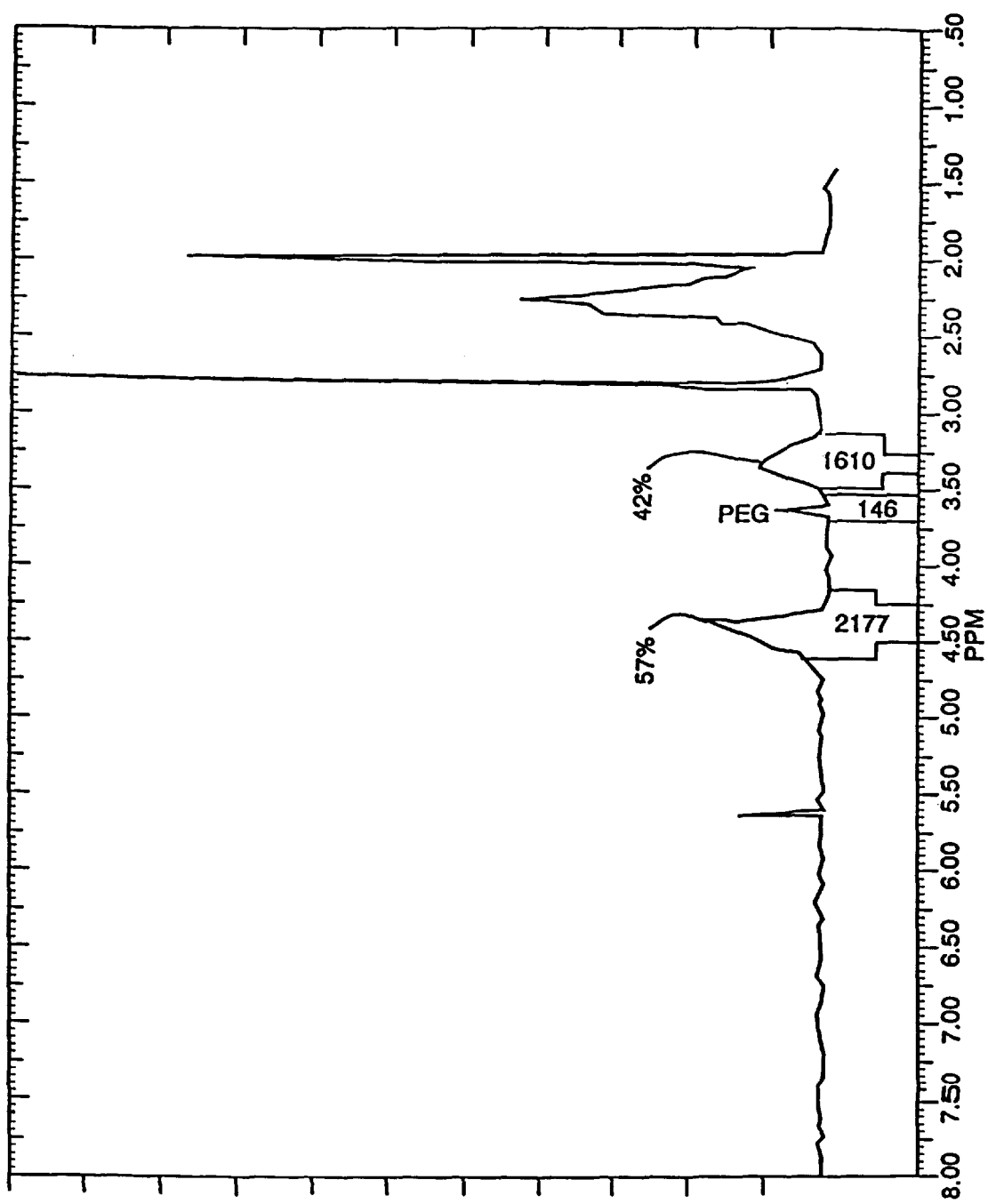
FIG. 7 shows the $^1$H NMR spectrum for the hydrolyzed polymer coupled to M-PEG-NH$_2$

FIG. 7 shows the spectrum for the hydrolyzed polymer coupled to M-PEG-NH$_2$, as prepared in Example 4. There is a small PEG peak at 3.61 ppm. This spectrum shows that the hydrolytic pathway is less effective at incorporating PEG into PAN/PVC than the reduction pathway; however, hydrolysis conditions could be optimized to provide more incorporation of the PEG if desired.

EXAMPLES 5–9

Measurement of Protein Adsorption, Diffusion, and nMWCO

EXAMPLE 5

Flatsheet Adsorption Study

An FTA solution was prepared by dissolving 9.23 g of FTA and 0.5 g of sodium azide into 1 l of water. A 5% BSA solution was prepared by dissolving 5 g BSA into 100 ml of the FTA solution with stirring. Three flatsheets were mounted in 3 chambers with BSA solution on one side and FTA on the other at room temperature. The permselective layer was facing the FTA solution. The solution on either side was monitored by UV absorbance for BSA. When the BSA had diffused across the membrane to an equilibrium value, the flatsheets were removed, washed 5 times with FTA, and assayed by the BCA test for protein adsorption. The flatsheets exposed to the BCA test were 1 cm in diameter. The amount of protein adsorbed was estimated from a calibration curve ($\mu$g/ml) which was then converted to $\mu$g/cm$^2$ by dividing by the approximate surface area of the flatsheet.

EXAMPLE 6

Fiber Adsorption Study

Three 1 cm long fibers of each type were immersed in 5% BSA in 6-well plates and incubated at 37° C. for 3 days. The fibers were removed and washed 5 times with FTA over 1 h and then assayed by the BCA test for protein adsorption. The amount of adsorbed protein was calculated by comparison to a calibration curve for BSA ($\mu$g/ml) which was then converted to $\mu$g/cm$^2$ by multiplying by 0.1 ml and then dividing by the approximate surface area of the fiber ($\pi$dl).

EXAMPLE 7

BCA Test

A standard BCA test procedure was followed. One fiber or flatsheet not exposed to any protein solution was used as the control and the blank solution consisted of FTA alone. Three fibers or flatsheets were exposed to BCA reagents for 2 h at room temperature and then the UV absorbance was read on a microplate reader using Softmax hardware.

EXAMPLE 8

Diffusion Test

Fibers 2.5 cm long were glycerinized and then fitted with 0.5 cm tecoflex using polyurethane glue. The fibers were then deglycerinized by immersion in FTA for at least 2 days. The fibers were quickly dried and then 40 $\mu$l of 3 mg/ml of $\alpha$-chymotrypsinogen was inserted via pipet into the lumen of a fiber. The fiber was sealed by heating the tecoflex end and then rinsed in FTA for approximately 2 minutes before inserting the fiber (vertically) into 6 ml of FTA in a 15 ml conical centrifuge tube. Diffusion was monitored by UV absorption at 281 nm over 24 h.

EXAMPLE 9

Determination of Nominal Molecular Weight Cutoff (nMWCO)

The nMWCOs of fibers 2 cm long were characterized by the MWCO test to determine what size molecules will cross the membranes. The extent to which a given molecular weight molecule will cross a membrane is measured by the rejection coefficient, R, such that $R=1-C_p/C_r$, where $C_p$ is the concentration in a solution of a molecular weight molecule that crosses a membrane and $C_r$ is the concentration of the molecule that is excluded by the membrane. A membrane's nMWCO is the molecular weight of a molecule with $R \geq 90\%$. MWCO is measured under convective (pressurized) conditions 5±1 psig) and ambient room temperature (18–28° C.). Normally 10–20 fibers are measured simultaneously (cartridge test) but individual fibers can be measured by making a single fiber coil (coil test).

The data obtained from Examples 5–9 is summarized in Table I.

TABLE I

| Sample<br>HF = hollow fiber<br>FS = flatsheet | Protein<br>Adsorption<br>(BSA) ($\mu$g/cm$^2$) | MWCO<br>BSA<br>Permeability |
|---|---|---|
| PAN/PVC (HF) | 17.1 ± 1.5 | 95% |
| PAN/PVC-PEG-NH$_2$ (5 k) (HF) | 12.0 ± 1.0 | 95% |
| PAN/PVC-PEG-NH$_2$ (20 k) (HF) | 11.7 ± 0.8 | |
| PAN/PVC (FS) | 1.3 ± 0.6 | n/a |
| PAN/PVC-PEG-NH$_2$ (5 k) (FS) | 0.6 ± 0.0 | n/a |
| PAN/PVC-PEG-SC (8 k) (FS) | 0.6 ± 0.0 | n/a |
| PAN/PVC-PEG-SC (20 k) (FS) | 0.5 ± 0.0 | n/a |

As can be seen from Table I, grafting PEG-NH$_2$ to PAN/PVC decreased the amount of protein adsorbed relative to non-grafted PAN/PVC. However, the molecular weight cut-off did not changed appreciably after the surface modification reaction with PEO. It is likely that polyethylene oxide-functionalized PAN/PVC enhances apparent diffusion by decreasing the amount of protein that is adsorbed during diffusion. The molecular weight cut-off data indicates that the pore structure is not adversely affected by the chemistry involved in grafting polyethylene oxide.

EXAMPLE 10

Insulin Passivated Fibers

Fibers were prepared as in Examples 1–4 above. Then the procedure of Example 8 was followed, however after degylcerinization the fibers were soaked in an insulin containing buffer @ 37° C. for 16 hours. The results of the diffusion test are shown in Table II below.

TABLE II

| Sample | Dmc Insulin-Treated ($cm^2/s \times 10^8$) (n = 3) | Dmc Not Treated ($cm^2/s \times 10^8$) (n = 3) |
| --- | --- | --- |
| PAN/PVC | 3.0 | 0.3 |
| PAN/PVC-PEO-NH$_2$ (5 k) | 1.0 | 0.9 |
| PAN/PVC-PEC-NH$_2$ (20 k) | 2.2 | 1.6 |
| PAN/PVC-PEO-SC (8 k) | 0.7 | 0.8 |
| PAN/PVC-PEO-SC (20 k) | 0.7 | 0.6 |

Typically, insulin passivation affects an increase in the diffusion coefficient (Dmc) of PAN/PVC. However, insulin passivation has little affect on the diffusion coefficient of PEO-grafted PAN/PVC. Given the presumption that insulin passivates the PAN/PVC membrane by adsorption, it is likely that only an insignificant amount of insulin adsorbs to PEO-PAN/PVC. Thus, PEO effectively inhibits protein adsorption and thus insulin passivation does not affect the diffusion coefficient of PEO-PAN/PVC.

EXAMPLE 11

Biocompatibility of PEO-PAN/PVC

In vivo biocompatibility of PEG-grafted PAN/PVC was assessed by implanting fibers into the brain and subcutaneous sites of Lewis rats (about 250 g). Fibers with and without PEG were implanted. The fibers were sterilized by immersion in 70% ethanol overnight and then in sterile Hanks media for 2 days. The fibers were approximately 6 mm in length and 0.8 mm in width. They were heat-sealed as a primary seal. A secondary seal was prepared by immersing the heat-sealed ends into a polyacrylate glue which was then crosslinked by UV-irradiation, thereby forming a secondary seal. The sealed fibers were held at 37° C. in HL-1 media for 2 days and then rinsed in sterile Hanks media twice prior to implanting. The fibers were implanted unilaterally into the striatum of the brain of the rats for 4 weeks after which the brain was histologically sectioned.

Overall biocompatibility was assessed in terms of the fibers' interaction with brain tissue. The fibers were compared as described in Table III for the response to the implanted hollow fiber membranes of macrophages (MACs), foreign body giant cells (FBGCs), polymorphonuclear leukocytes (PMNs), eosinophils (EOs), and reactive astrocytes. The p values were calculated relative to unmodified PAN/PVC using Mann-Whitney U-test wherein significance is set at $p<0.05$.

TABLE III

| Sample (n = 4) | MACs (p values) | FBGCs (p values) | PMNs | EOs |
| --- | --- | --- | --- | --- |
| PAN/PVC | 1.75 | 2 | 1 | 1 |
| PAN/PVC-PEO-NH$_2$ (5 k) | 1.5 (0.75) | 1 (0.05) | 1 | 1 |
| PAN/PVC-PEO-NH$_2$ (20 k) | 1.25 (0.47) | 1.25 (0.16) | 1 | 1 |
| PAN/PVC-PEO-SC (5 k) | 1.25 (0.47) | 1.25 (0.16) | 1 | 1 |

Based on the response of reactive cells to the implanted hollow fiber membrane in the central nervous'system and when compared to Sham surgical controls with a score of 1, PAN/PVC showed average biocompatibility with an overall rating of 1.8 (n=4), whereas PEO-grafted PAN/PVC [PAN/PVC-PEO-NH$_2$ (5K and 20K)] showed improved biocompatibility with an overall rating of 1.2 (n=8). Using the Mann-Whitney U-test, a statistical difference (p values) between PAN/PVC and PEG-grafted PAN/PVC existed for the response of FBGCs but not for that of MACs (EOs or PMNs). The in vivo experiment indicates that, qualitatively, the biocompatibility is enhanced for PAN/PVC-PEO with respect to PAN/PVC. The response of PMNs to the implanted fibers was acceptable (i.e. 1), indicating that all implants were sterile and that no gross contamination was introduced during surgery. In addition, eosinophils were not found at the implant site, indicating that the membrane did not evoke an allergic response. The response of immunoreactive GFAP astrocytes to the different fiber types followed the same trends described above.

EXAMPLE 12

PEO Modification of PAN/PVC Resin

A PAN/PVC resin is dissolved in an organic solvent such as dimethyl sulfoxide (DMSO), n-methyl pyrrolidone (NMP) or acetone. The resin is then reacted with sodium borohydride dissolved in the same solution. The reaction results in the modification of the PAN/PVC resin by reduction of the nitrile group to an amine group. The reduced PAN/PVC-NH$_2$ is then precipitated repeatedly in water, dried under vacuum and characterized.

Methoxy-terminated poly(ethylene oxide)-succinimidyl carbonate (PEG-SC—either 5,000 g/mole or 20,000 g/mole) is dissolved in an organic solvent as is the PAN/PVC-NH$_2$. The PEG-SC and PAN/PVC-NH$_2$ are reacted together to further modify up to about 2.0% of the —NH$_2$ groups to result in the formation of PAN/PVC-PEO. Greater than 2.0% modification may change the membrane formulation properties of the PAN/PVC resin. The derivatized polymer is precipitated repeatedly in water, dried and then characterized. The modified PAN/PVC, PAN/PVC-NH$_2$ and PAN/PVC-PEO are characterized by at least three of the following techniques: $^1$HNMR, fluorescamine titration, size exclusion chromatography, ion exchange chromatography, and FTIR.

The parameters that are important for polymer modification are polymer molecular weight and the ratio of the types of monomers in the polymer. The polymer molecular weight can be determined by a number of techniques well known to those skilled in the art, including gel permeation chromatography, light scattering, and dilute solution viscosity. The ratio of the types of monomers in the copolymer can be determined by elemental analysis if the monomers have distinct elements [e.g. PAN/PVC has nitrogen and chlorine that distinguish each monomer] or by proton nuclear magnetic resonance ($^1$H NMR).

The ratio of reagents to be used in the reactions described above depends upon the percent conversion. The example described below assumes 100% conversion of both PAN/PVC to PAN/PVC-NH$_2$ and PAN/PVC-NH$_2$ to PAN/PVC-PEO. Given that the molecular weight of PAN/PVC is approximately 140,000 g/mole, and that the PAN/PVC is approximately 45% acrylonitrile (53 g/mole) and 55% vinyl chloride (62 g/mole), there are approximately 63,000 g/mole acrylonitrile or 1188 acrylonitrile repeat units and 77,000 g/mole vinyl chloride or 1242 vinyl chloride repeat units. For a 2.0% modification with PEO, 4.4% or 53 repeat units of acrylonitrile groups are modified. Assuming that the percent conversion of nitrile to amine is 100% and that of amine to succinimide is 100%, then the ratio of sodium borohydride to PAN/PVC and that of PEO-SC to PAN/VC-NH$_2$ can be determined on a molar basis. Given that the desired percent conversion is 2.0%, 2809 g/mole of PAN/PVC are required. Thus, if 200 g (0.071 moles) of PAN/PVC are to be modified, one must react 0.071 moles (2.71 g) of sodium borohydride with it. Similarly, with 200 g (~0.071 moles) of PAN/PVC-NH$_2$, an equal molar amount of PEO-SC is required. For 0.5% modification, 1.1% of the nitrile groups are modified. This is true for PEO 5,000 and PEO 20,000. If the percent conversion of either PAN/PVC to PAN/PVC-NH$_2$ or PAN/PVC-NH$_2$ to PAN/PVC-PEO is not 100%, then the molar ratios set forth above have to be modified accordingly.

What is claimed is:

1. A graft polymer formed from a backbone polymer containing

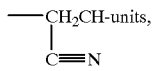

units,
by hydrolyzing a portion of said —C≡N (cyano) groups, converting such groups into intermediate reactive sites, and then grafting polyalkylene oxide polymer chains to said backbone polymer through said reactive sites, wherein said backbone polymer comprises a copolymer of acrylonitrile and vinyl chloride.

2. A graft polymer formed from a backbone polymer containing

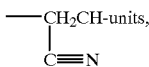

units,
by hydrolyzing a portion of said —C≡N (cyano) groups, converting such groups into intermediate reactive sites, and then grafting polyalkylene oxide polymer chains to said backbone polymer through said reactive sites, in which said reactive sites comprise —CO$_2$H groups which react with an amine terminal group on precursor polyalkylene oxide polymer chains to form said graft polymer.

3. The graft polymer of claim 2 wherein said backbone polymer is selected from the group consisting of PAN-co-vinylidene chloride, PAN-co-acrylic acid, PAN-co-butadiene-styrene, PAN-co-butadiene, PAN-co-vinyl acetate, PAN-co-4-vinyl pyridine, PAN-co-butadiene-co-acrylic acid, and PAN-co-maleic anhydride.

4. The graft polymer of claim 2 wherein said backbone polymer is a polyacrylonitrile homopolymer.

5. The graft polymer of claim 1 or 2 in which said polyalkylene oxide comprises polyethylene oxide.

6. The graft polymer of claim 1 or 2 wherein said backbone polymer is in the form of a resin and said graft polymer is in the form of a resin.

7. The graft polymer of claim 1 or 2 wherein said graft polymer is in the form of a membrane, said membrane being permselective.

8. The graft polymer of claim 1 or 2 wherein said graft polymer is in the form of a membrane, said membrane being permselective, and wherein the graft polymer is in the form of a hollow fiber or flat sheet device.

9. The graft polymer of claim 1 or 2 wherein the graft polymer is in the form of a membrane, the membrane being permselective, wherein the graft polymer is in the form of a hollow fiber or flat sheet device, and wherein the graft polymer further comprises living cells contained within said hollow fiber or flat sheet device.

* * * * *